United States Patent
Zimmerer et al.

[15] 3,659,627
[45] May 2, 1972

[54] COLLECTOR RING FOR IRRIGATION PIPE SYSTEMS

[72] Inventors: Arthur L. Zimmerer; Bernard J. Zimmerer; Paul B. Zimmerer, all of Lindsay, Nebr.

[73] Assignee: Lindsay Manufacturing Co., Lindsay, Nebr.

[22] Filed: Dec. 21, 1970

[21] Appl. No.: 100,157

[52] U.S. Cl. ............................137/344, 239/212, 239/177
[51] Int. Cl. ..........................................B05b 9/02, E01h 3/02
[58] Field of Search ..................137/344, 580; 239/212, 213, 239/177

[56] References Cited

UNITED STATES PATENTS

| 2,892,593 | 6/1959 | Smeltzer | 239/177 |
| 3,259,319 | 7/1966 | Wallace | 239/212 X |
| 3,335,958 | 8/1967 | Wallace | 239/212 X |
| 3,352,493 | 11/1967 | Curtis | 137/344 X |
| 3,353,750 | 11/1967 | Dowd | 137/344 X |
| 3,406,907 | 10/1968 | Wallace | 239/212 X |

Primary Examiner—Samuel Scott
Attorney—Zarley, McKee & Thomte

[57] ABSTRACT

A collector ring assembly for irrigation pipe systems which permits electrical power to be supplied from the center pivot assembly to the electrical motors on the self-propelled towers which support the pipe and propel the pipe around the pivot assembly in a predetermined path. The collector ring assembly comprises a plurality of horizontally disposed, vertically spaced electrical contacts which are fixed against rotation and which are electrically connected to a source of electrical energy. A brush or wiper assembly is rotatably mounted with respect to the electrical contacts and wipe upon the contacts as the irrigation pipe is moved around the center pivot assembly. The brushes are electrically connected to the electrical motors on the towers to provide electrical energy thereto.

10 Claims, 5 Drawing Figures

Patented May 2, 1972　　　3,659,627
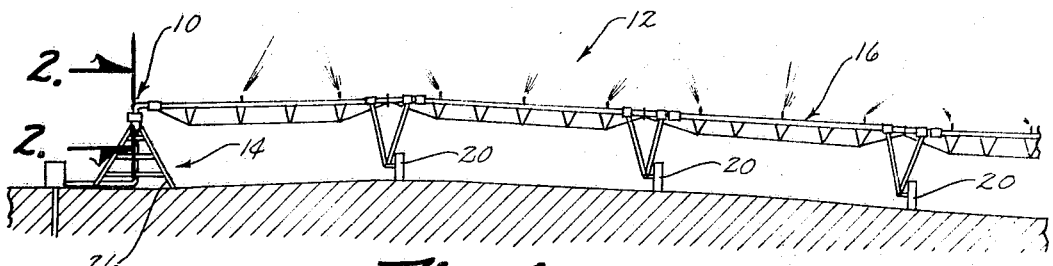
Fig. 1
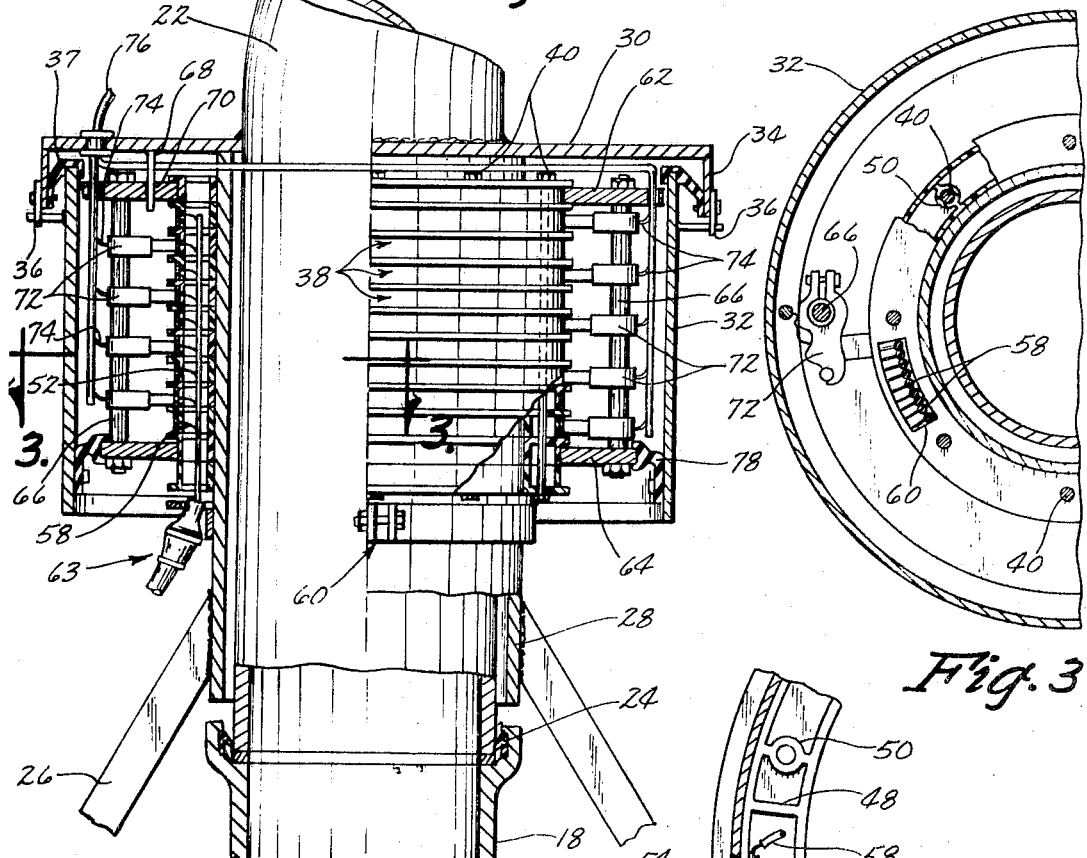
Fig. 2
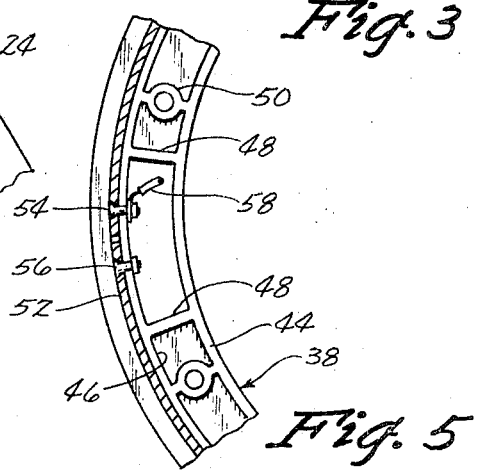
Fig. 3
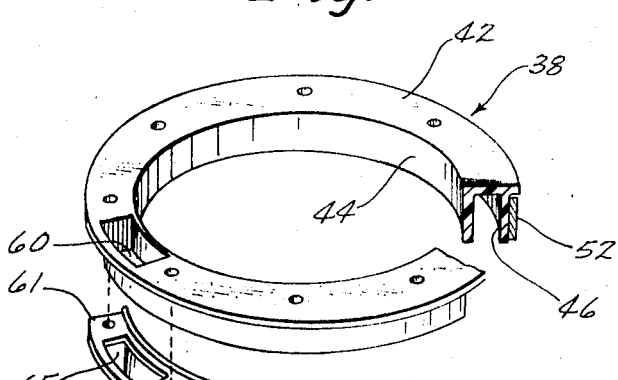
Fig. 4
Fig. 5
INVENTORS
ARTHUR L. ZIMMERER
BERNARD J. ZIMMERER
PAUL B. ZIMMERER
BY
Zarley, McKee & Thomte
ATTORNEYS

COLLECTOR RING FOR IRRIGATION PIPE SYSTEMS

Self-propelled irrigation systems of the center pivot type comprise generally a center pivot assembly having an overhead irrigation pipe extending horizontally therefrom. The irrigation pipe is supported and propelled by a plurality of towers spaced along the length thereof. In many systems, the towers are driven by electric motors so that the pipe is pivotally moved around the pivot assembly in a predetermined path. A problem is encountered in supplying electrical energy from the pivot assembly to the electric motors due to the rotational movement of the irrigation pipe with respect to the pivot assembly. In some systems, an electrical cord or wire is simply extended from the electrical source, at the center pivot, to the motors. Repeated revolutions of the pipe with respect to the pivot assembly causes the cord to be wrapped around the center pivot structure. In such situations, it is then necessary to unwrap the cord before it breaks which is time consuming and detracts from the automatic operation of the system. In other systems, the electrical wires have been extended upwardly through the center pivot pipe in an attempt to eliminate the "wrapping" problem. The positioning of the wires in the center pivot pipe not only presents maintenance problems but also restricts the flow of water through the pipe.

Therefore, it is a principal object of this invention to provide a collector ring means for irrigation pipe systems.

A further object of this invention is to provide an electrical collector ring means for overhead irrigation pipe systems.

A further object of this invention is to provide a collector ring means for irrigation pipe systems wherein the electrical contact thereof may be easily repaired or replaced.

A further object of this invention is to provide a collector ring means which is comprised of a plurality of individual electrical contacts which are stacked with respect to each other so that any number of contacts may be employed depending upon the particular system.

A further object of this invention is to provide a collector ring means for irrigation pipe systems which is mounted exteriorly of and around the center pivot pipe.

A further object of this invention is to provide a collector ring means for irrigation pipe systems which is economical of manufacture and durable in use.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a partial side view of a typical irrigation system employing the device of this invention.

FIG. 2 is an enlarged sectional view seen along lines 2—2 of FIG. 1.

FIG. 3 is a sectional view seen along lines 3—3 of FIG. 2.

FIG. 4 is a perspective view of one of the electrical contact assemblies, with a portion thereof cut away; and FIG. 5 is a partial horizontal sectional view of one of the electrical contact assemblies.

The collector ring of this invention is generally designated by the reference numeral 10 and is designed for use in a center pivot irrigation system 12 generally including a center pivot assembly 14 and an overhead irrigation pipe 16 extending therefrom. The center pivot assembly 14 comprises generally an upstanding supply pipe 18 which is in communication with a source of water under pressure to supply water to the sprinkler heads disposed along the length of the pipe 16. Pipe 16 is supported and propelled by a plurality of self-propelled towers 20 provided along the length thereof which have electric motors thereon for driving the same to cause the pipe 16 to be propelled around the center pivot assembly 14 in a predetermined path.

Pipe 16 includes a downwardly extending pipe portion 22 which is rotatably received by the open upper end of the pipe 18 as illustrated in FIG. 2. A gasket 24 is provided between pipe portion 22 and pipe 18 to prevent leakage of water therebetween. Center pivot assembly 14 also includes a plurality of support legs 26 which extend upwardly from the supporting surface in a converging fashion and which have a sleeve 28 welded to the upper ends thereof as seen in FIG. 2. Sleeve 28 embraces pipe portion 22 as seen in FIG. 2 and engages the underside of a circular plate 30 which is welded to pipe portion 22 and which extends outwardly therefrom. A tube 32 is secured to the flange portion 34 of the plate 30 by hanger assemblies 36 and extends downwardly therefrom as illustrated in FIG. 2 and acts in conjunction with plate 30 to form a shield around the collector ring 10. Seal 37 extends between flange portion 34 and tube 32 to seal the upper end of tube 32.

Collector ring 10 includes a plurality of horizontally disposed, ring-shaped electrical contact assemblies 38 which are secured together by a plurality of bolts 40 and which extend around the exterior of the sleeve 28 as illustrated in FIG. 2. The assemblies 38 comprise generally a top wall 42, inner wall 44 and outer wall 46 which is spaced from inner wall 44 as illustrated in FIG. 4. A plurality of spaced apart support walls 48 extend between the walls 44 and 46 as illustrated in FIG. 5 to strengthen the assembly. Each of the assemblies 38 also include tube sections 50 which are secured to the walls 44 and 46 as seen in FIG. 5 which are adapted to receive the bolts 40 extending therethrough. The electrical contact assemblies 38 are constructed of a suitable electrical insulative material such as plastic.

An electrical conductive strip 52 extends around the exterior surface of wall 46 as illustrated in FIG. 4 and 5 and is secured to the assembly 38 by bolts 54 and 56 extending through the opposite ends thereof as seen in FIG. 5. The strip 52 is preferably constructed of a brass material as is the bolt 54. Thus, the desired number of assemblies 38 are stacked upon one another as seen in FIG. 2 and are secured together by the bolts 40 extending through the tube sections 50. Each of the bolts 54 of each of the assemblies 38 are electrically connected to a lead wire 58 which extends downwardly through a cavity 60 in the assembly 38 and extends from the lower end of the collector ring as seen in FIG. 2. The lead wires 58 are connected to a source of electrical energy at the center pivot assembly 14. A clamp means 60 extends around sleeve 28 as seen in FIG. 4. As seen in FIG. 4, a coupling holder 61 is secured to clamp means 60 and has a pair of openings formed therein which are adapted to receive two of the bolts 40 to maintain the electrical contact assemblies 38 on the sleeve 28 and to prevent their rotation with respect to the center pivot assembly 14. A nipple 63 is received in opening 65 of holder 61 through which the leads 58 extend.

Collector ring 10 also includes top and bottom support rings 62 and 64 which are positioned with respect to the assemblies 38 as seen in FIG. 2 and which are maintained in such a position by the support bolts 66 extending therebetween. The uppermost assembly 38 does not have a brass strip 52 thereon so that the inner end of the ring 62 may be positioned adjacent the outer wall 46. As seen in FIG. 2, the lowermost assembly 38 is reversed or "upside down" with respect to the assembly 38 thereabove. The two lowermost assemblies 38 do not have the brass strip 52 mounted thereon to permit the inner end of the ring 64 to be positioned adjacent thereto. Drive pin 68 is welded to the bottom surface of plate 30 and extends downwardly through an opening 70 in top ring 62 so that rotation of plate 30 will cause the rotation of the ring 62, bolts 66 and bottom ring 64. A plurality of wiper or brush assemblies 72 are mounted on the bolts 66 in a spaced apart manner and are adapted to wipe on the brass strips 52. A lead wire 74 extends from each of the wiper assemblies 72 and extends upwardly through openings in plate 62 and thence through a conduit 76 which extends outwardly from the plate 30 along the pipe 16. Each of the lead wires 74 are connected to an electric motor or control circuit on one of the towers 20 so that electrical energy can be supplied thereto through the lead wire 58, bolt 54, brass strip 52, wiper assembly 72 and lead wire 74. A seal means 78 is secured to the lower end of tube 32 and engages the outer end of ring 64 to prevent moisture or dust from entering the interior of the assembly.

In operation, electrical current is supplied to the individual motors and control circuits on the towers 20 through the collector ring 10 as just described. The control means on the towers activates the individual motors to cause the pipe 16 to be rotated around the center pivot assembly 14. The movement of the pipe 16 around the center pivot assembly 14 causes the downwardly extending pipe portion 22 to rotate with respect to the pipe 18. The rotation of the pipe portion 22 causes the plate 30 to be rotated which in turn causes the rings 62 and 64, bolts 66 and the wiper assemblies 72 thereon to be rotated therewith. The wiper assemblies 72 wipe on their respective brass strips 52 as the pipe portion 22 is rotated and the engagement of the wiper assemblies with the brass strip 52 provides a means for supplying electrical current to the tower motors and control circuits as the pipe 16 is rotated around the center pivot assembly 14. The collector ring 10 of this invention eliminates the wrapping problem associated with those irrigation systems employing an electrical cord or wire which extends from the electric power source to the tower motors. The collector ring of this invention, by being mounted on the exterior of the supply pipe, is easily maintained and does not restrict the flow of water through the delivery pipe. Any number of electrical contact assemblies 38 may be employed and the number of the assemblies would depend upon the number of assessories or options being employed. The brass strip 52 on the assembly 38 may be easily removed for repair and replacement and such a feature greatly reduces the cost of the collector ring assembly.

Thus it can be seen that a novel collector ring assembly has been provided for a center pivot irrigation pipe system which requires little maintenance and which is extremely efficient in operation. Therefore, it can be seen that the collector ring accomplishes at least all of its stated objectives.

We claim:
1. In combination,
a fixed water supply pipe including an upstanding pipe portion,
a water delivery pipe means including a downwardly extending pipe portion operatively rotatably connected to said upstanding pipe portion,
at least one tower means along said delivery pipe means for supporting said pipe means above the ground, said tower means including an electric power means thereon for pivotally moving said delivery pipe means around said upstanding pipe portion in a predetermined path,
an electrical collector ring means mounted exteriorly of and around said downwardly extending pipe portion, said collector ring means including at least one ring shaped horizontally disposed electrical contact which is fixed against rotation with respect to said downwardly extending pipe portion, said collector ring means including a first support means which is secured to said downwardly extending pipe portion for rotational movement therewith, an electrical wiper means on said support means wipe upon said contact, a first lead means connected to and extending between said wiper means and said power means, and a second lead means connected to said electrical contact and extending to a source of electrical energy whereby electrical energy is supplied from said source through said collector ring means to said power means.

2. The combination of claim 1 wherein said collector ring means has a sealed shield means extending therearound.

3. The combination of claim 1 wherein a vertically disposed sleeve means embraces said downwardly extending pipe portion, said downwardly extending pipe portion being rotatable with respect to said sleeve means, said ring shaped electrical contact extending around said sleeve means and being rigidly secured thereto, and a second support means secured to said sleeve means for rigidly supporting said sleeve means to prevent movement thereof, said first support means being rotatable with respect to said sleeve means.

4. The combination of claim 3 wherein said first support means comprises a horizontally disposed plate means rigidly secured to said downwardly extending pipe portion above the upper end of said sleeve means, said sleeve means engaging said plate means to rotatably support said plate means, and means interconnecting said plate means and said wiper means whereby rotation of said downwardly extending pipe portion and said plate means will cause said wiper means to rotate with respect to said electrical contact.

5. The combination of claim 1 wherein said electrical contact means comprises a ring shaped, electrically insulative member having a vertically disposed first wall, and a electrically conductive strip secured to and extending around said wall, said strip being electrically connected to said second lead means, said wiper means wiping upon said strip as said downwardly extending pipe portion rotates with respect to said upstanding pipe portion.

6. The combination of claim 5 wherein said strip is removably secured to said insulative member for replacement thereof.

7. The combination of claim 5 wherein a plurality of towers support said pipe means and wherein a plurality of insulative members are secured together in a vertically stacked relationship, means securing said members together, said wiper means comprising a plurality of wiper elements wiping upon the strips of the insulative members, each of said wiper elements being electrically connected to one of the electric power means on said towers.

8. The combination of claim 7 wherein each of said insulative members comprises a ring shaped, horizontally disposed top wall having inner and outer peripheries on inner wall extending vertically downwardly from the inner periphery of said top wall, said first wall extending downwardly from said top wall outwardly of said inner supporting and spaced therefrom, said top wall of said member supporting the lower ends of the inner and first walls of the member immediately thereabove.

9. The combination of claim 7 wherein said collector ring means has vertically spaced apart, horizontally disposed ring shaped plates which rotatably embrace said stacked insulative members adjacent the upper and lower ends thereof, bolt assemblies connecting said plates, said wiper elements being secured to and supported by said bolt assemblies in a vertically spaced relationship.

10. The combination of claim 9 wherein a drive pin means connects the uppermost plate of said ring shaped plates to said first support means so that said ring shaped plates, bolt assemblies and wiper elements will be rotated as said downwardly extending pipe portion is rotated.

* * * * *